United States Patent [19]
Sawano

[11] 4,050,699
[45] Sept. 27, 1977

[54] QUICK REPLAY DEVICE

[76] Inventor: Keijiro Sawano, Ohanachaya 3-25-7, Katsushika, Tokyo, Japan

[21] Appl. No.: 693,133

[22] Filed: June 7, 1976

[51] Int. Cl.² .............................................. G11B 17/06
[52] U.S. Cl. ................................................ 274/15 A
[58] Field of Search ................. 274/15 A, 15 B, 15 R

[56] References Cited
U.S. PATENT DOCUMENTS

| | | | |
|---|---|---|---|
| 1,318,104 | 10/1919 | O'Rear | 274/15 A |
| 1,407,090 | 2/1922 | Shaw | 274/15 A |
| 1,631,797 | 6/1927 | Cooke et al. | 274/15 R |
| 2,265,490 | 12/1941 | O'Rear | 274/15 A |
| 2,838,315 | 6/1958 | Staar | 274/39 R |
| 3,071,381 | 1/1963 | Schneider | 274/39 R |

FOREIGN PATENT DOCUMENTS 579,390 7/1924 France .................... 274/15 R

Primary Examiner—Harry N. Haroian
Attorney, Agent, or Firm—Steinberg & Blake

[57] ABSTRACT

A quick replay device of a portable record player with an adapter comprising a small disk, a springily pivotal elbow and a hooky pickup arm, said disk having a pivot for said elbow with a spring connection against a stopper on said disk, said elbow catching and lifting up said pickup arm at an innermost groove of a record to move over said record and to set down said pickup on a outermost groove of said record.

2 Claims, 6 Drawing Figures

QUICK REPLAY DEVICE

BACKGROUND OF THE INVENTION

1. Field of the Invention

This invention relates to music instruments, automatic, outside players, disk, electric, cabinet type, and constant power, electric control; and accessories.

2. Description of the Prior Art:

Generally the automatic repeater of the musical instrument has a large and complicated mechanism which is not suitable for the record player of the cabinet type.

Whereas this invention provides a portable record player with a special elbow-type arm repeater, which means a quick replay device.

BRIEF SUMMARY OF INVENTION

This invention provides a quick replay device of a portable record player with an adapter comprising a small disk, a springily pivotal elbow or lever and a hooky pickup arm, said disk having a pivot for said elbow with a spring connection against a stopper on said disk, said elbow having a catching end to meet and part a hook of said pickup arm, said elbow also having therebeneath a convex point which will slide on said disk to lift up said pickup over a record until said convex point slips down from a circumference of said disk to let a needle of said pickup set again on an outermost groove of said record when said elbow will part from said hook of said pickup arm and spring back to said stopper of said disk.

DETAILED DESCRIPTION OF INVENTION

Figure 1:
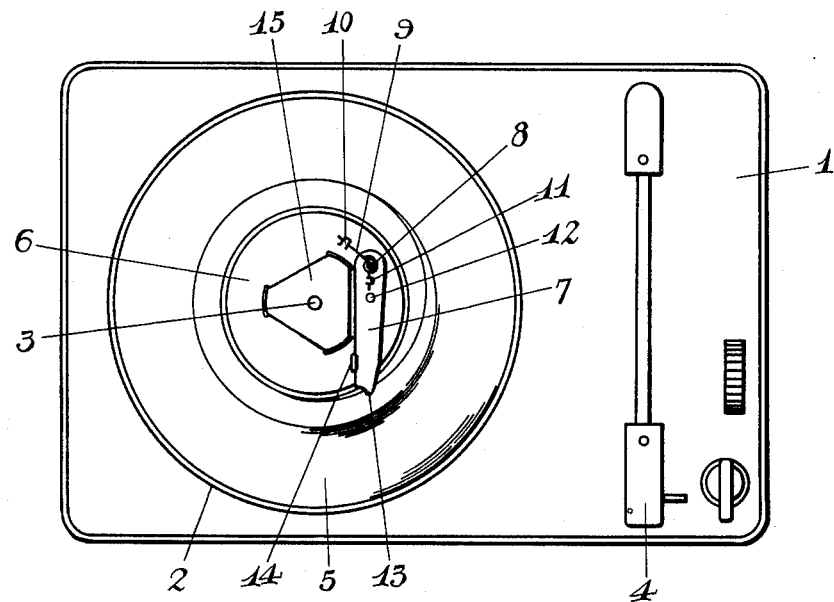
FIG. 1 is a top plan view of a quick replay device of this invention.
Figure 2:
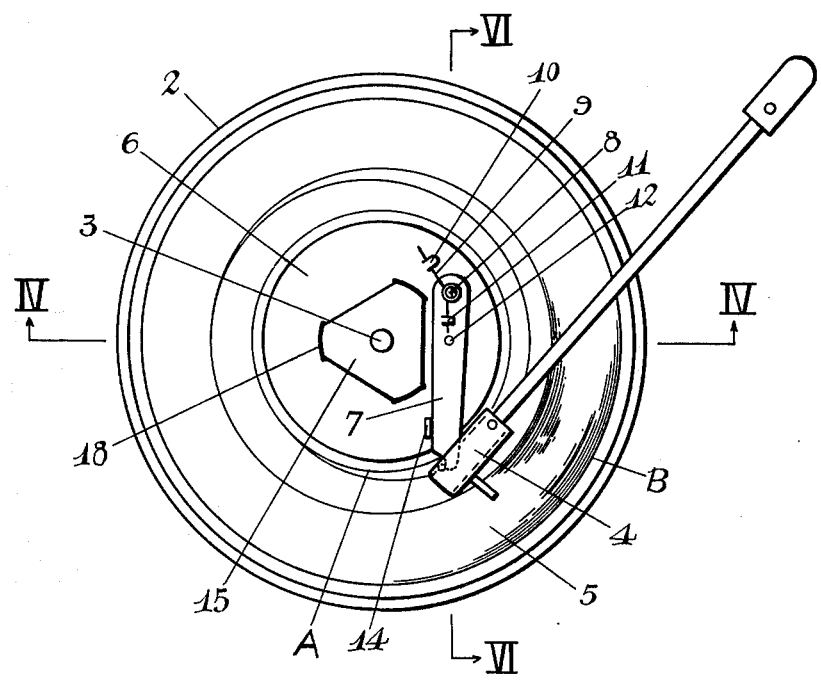
FIG. 2 is a top plan enlarged view thereof, when a pickup is playing on an innermost groove of a record.
Figure 3:
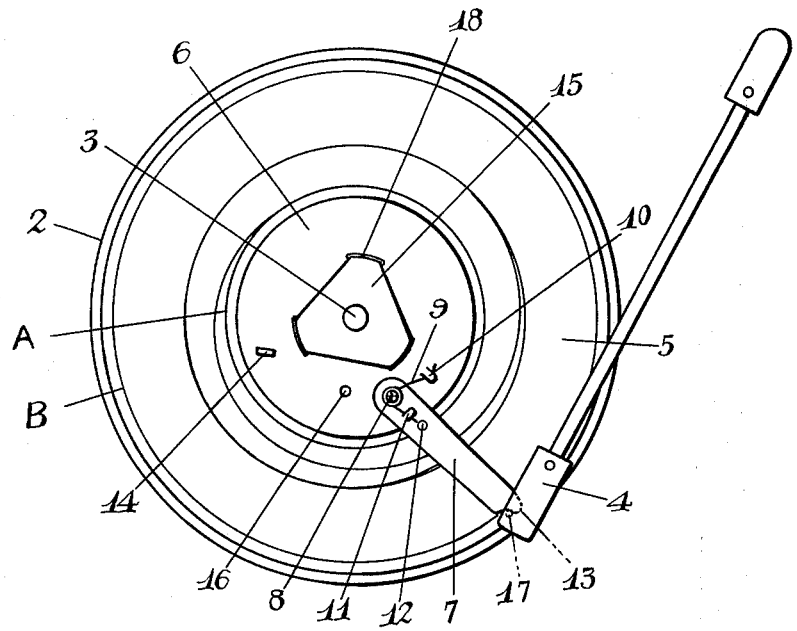
FIG. 3 is a top plan enlarged view thereof, when the pickup is playing on an outermost groove of the record.
Figure 4:
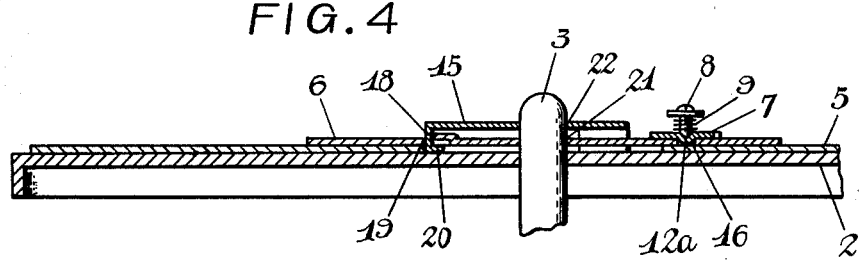
FIG. 4 is a cross-section along the lines IV—IV of FIG. 2.
Figure 5:
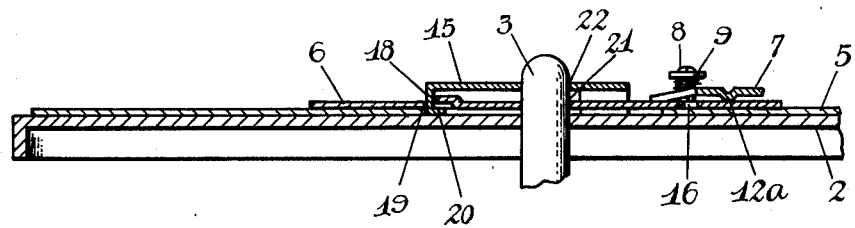
FIG. 5 is a cross-section of moving an elbow slightly in FIG. 4.
Figure 6:
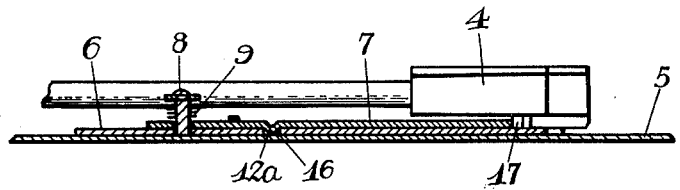
FIG. 6 is an enlarged cross-section along the lines VI—VI of FIG. 2.

Referring now to FIG. 1, there is a deck 1, a turntable 2, a shaft 3, a pickup 4 and a record 5.

A disk 6 is placed on the record 5.

An elbow 7 is springily pivotally provided on the disk 6 chordally.

A pivot 8 is fixed through an end of the elbow 7 at the disk 6.

A spring wire 9 is coiled about the pivot 8.

A tongue 10 is formed on the disk 6 to fix an end of the wire 9.

A tongue 11 is formed on the elbow 7 to fix another end of the wire 9.

A concave point 12 is indented at the elbow 7.

A hook 13 is formed at another end of the elbow 7 to associate and dissociate with an end of the pickup 4.

A stopper 14 is risen on the disk 6 to stop the elbow 7 near the hook 13.

An adapter 15 is mounted on the disk 6 centrally.

Referring next to FIGS. 2 to 6, a small hole 16 is formed at the disk 6 and positioned to fit therein a convex point 12a which is rear side of the concave point 12 of the elbow 7.

A knob 17 projects downwards at said end of the pickup 4 to associate and dissociate with the hook 13 of the elbow 7.

With respect to relative dimensions of elements, the disk 6 shall have a radius which is in length shorter than the radius of an innermost groove A of the record 5.

A radial distance of the pivot 8 on the disk 6 plus a distance between the pivot 8 and the concave point 12 shall be slightly longer than the radius of the disk 6 as the convex point 12a will slide on the disk 6 to lift up the pickup 4 the needle of which will never do harm to any sound groove of the record 5 until the convex point 12a slips down from the circumference of the disk 6 to let the needle of the pickup 4 set again on an outermost groove B of the record 5.

Then the radial distance of the pivot 8 on the disk 6 plus a length of the elbow 7 shall be approximately equal to the radius of outermost groove B of the record 5.

Adding to the adapter 15, it is formed as a triangle having three round corners which extend downwards three legs 18 through slits 19 of the disk 6, said leg 18 having a foot 20 to set in a concave of the rear side of the disk 6, said leg possibly fitting inside the central opening of the doughnut type record.

Holes 21, 22 are formed respectively at the disk 6 and the adapter 15 centrally in order to be inserted by the shaft 3.

What I claim is:

1. A quick replay device comprising a relatively small disk adapted to be situated on a turntable of a record player coaxially with a record which is situated beneath said disk, the latter having an outer periphery situated inwardly of the innermost groove of the record, said disk pivotally carrying a lever which is situated on top of said disk, and said disk having a stop while also carrying a spring which acts on said lever to urge the latter against said stop, and said lever when engaging said stop having a free hook end extending slightly beyond the outer periphery of said disk, the record player having a pickup arm which carries a stylus which when playing a record starts at an outer groove of the latter and progresses toward the innermost groove thereof, said pickup arm carrying a pin which engages said hook end of said lever when the stylus is at the innermost groove of the record, said disk being formed beneath said lever with a recess and said lever having a pointed projection extending into said recess of said disk when said spring holds said lever against said stop, the rotating turntable, when said pin of said pickup arm engages said hook end of said lever, causing the latter to be displaced away from said stop in opposition to said spring while said projection moves out of said recess and along an upper surface of said disk, so that said lever raises said pickup arm at said stylus thereof away from the record and while turning away from said stop displaces said pickup arm back toward said outer groove of the record, the length of said lever being such that when the stylus is again aligned with the outer groove of the record the hook end of said lever moves beyond said pin of said pickup arm so that the latter descends to again have its stylus situated in the outer groove of the record, while the separation of said lever from said pin of said pickup arm releases said lever to said spring to be returned thereby to a position engaging said stop, so that when the stylus again reaches the innermost groove of the record, the above operations will be automatically repeated whereby the record will be continuously replayed, the radial distance of the pivot axis of said lever from the axis of said disk and the distance from said pivot axis to said pointed projection being slightly greater than the radius of said disk, and said lever assuming a position when the stylus is situated over the outer groove of the record where said projection is situated slightly beyond said periphery of said disk, so that when the stylus is returned to the outer groove of the record not only does the hook end of the lever move beyond said pin of said pickup arm but also the projection becomes situated beyond the periphery of said disk so that the lever moves back down toward said disk to contribute also to the release of said lever by moving back down toward said disk when the stylus again engages the outer groove of the record.

2. The combination of claim 1 and wherein an adapter of substantially triangular configuration is situated coaxially with said disk on the turntable over said disk, said adapter having three substantially equidistantly spaced corner regions provided with feet which extend downwardly toward said disk, the latter being formed with openings through which said feet respectively extend, and said disk having at its lower surface depressions respectively extending radially from said openings, while said feet have beneath said disk extensions respectively received in said depressions.

* * * * *